(12) United States Patent
Siddiqui et al.

(10) Patent No.: US 11,431,917 B2
(45) Date of Patent: Aug. 30, 2022

(54) SYSTEM AND METHOD OF OPERATING A DISPLAY ASSOCIATED WITH AN INFORMATION HANDLING SYSTEM

(71) Applicant: Dell Products L.P., Round Rock, TX (US)

(72) Inventors: Asim Mukarram Siddiqui, Cedar Park, TX (US); Jongseo Lee, Austin, TX (US); Deeder M. Aurongzeb, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/068,359

(22) Filed: Oct. 12, 2020

(65) Prior Publication Data

US 2022/0116528 A1    Apr. 14, 2022

(51) Int. Cl.
  *G09G 3/34*  (2006.01)
  *G06T 7/70*  (2017.01)
  *H04N 5/235*  (2006.01)

(52) U.S. Cl.
  CPC ............ *H04N 5/2354* (2013.01); *G06T 7/70* (2017.01); *G09G 3/3406* (2013.01); *G06T 2207/30196* (2013.01); *G09G 2320/0646* (2013.01); *G09G 2354/00* (2013.01)

(58) Field of Classification Search
  CPC ............... H04N 5/2354; G06T 7/70; G06T 2207/30196; G09G 3/3406; G09G 2320/0646; G09G 2354/00
  See application file for complete search history.

(56) References Cited

U.S. PATENT DOCUMENTS

| 6,364,505 | B1* | 4/2002 | Shoenfeld | G02B 27/024 |
| | | | | 362/225 |
| 2005/0237319 | A1* | 10/2005 | Ranganathan | G09G 5/00 |
| | | | | 345/214 |
| 2007/0279376 | A1* | 12/2007 | Park | G09G 3/3413 |
| | | | | 345/102 |
| 2010/0005526 | A1* | 1/2010 | Tsuji | G06F 21/84 |
| | | | | 726/21 |
| 2013/0285993 | A1* | 10/2013 | Wu | G06F 1/3265 |
| | | | | 345/207 |
| 2014/0146069 | A1* | 5/2014 | Tan | G06F 3/04845 |
| | | | | 345/589 |
| 2016/0148554 | A1* | 5/2016 | Lim | G09G 3/342 |
| | | | | 345/694 |

(Continued)

*Primary Examiner* — Mihir K Rayan
(74) *Attorney, Agent, or Firm* — Baker Botts, L.L.P.

(57) ABSTRACT

In one or more embodiments, one or more systems, one or more methods, and/or one or more processes may acquire, via a camera associated with an information handling system (IHS), a first digital image; determine, from the first digital image, that a person is within a field of view of a display associated with the IHS; determine a first brightness level of first multiple light emitting diode (LED) pixels associated with a central zone associated with the display; set a brightness level of the first multiple LED pixels to the first brightness level; determine, based at least on the first brightness level, multiple second brightness levels for respective multiple zones associated with the display outside the central zone; and for each zone of the multiple zones, set a brightness level of LED pixels associated with the zone to a respective one of the multiple second brightness levels for the zone.

14 Claims, 7 Drawing Sheets

(56) References Cited

U.S. PATENT DOCUMENTS

2016/0202758 A1\* 7/2016 Peana .................. G09G 3/03
  345/601
2018/0321731 A1\* 11/2018 Alfano .............. G06F 1/3287

\* cited by examiner

SYSTEM AND METHOD OF OPERATING A DISPLAY ASSOCIATED WITH AN INFORMATION HANDLING SYSTEM

BACKGROUND

Field of the Disclosure

This disclosure relates generally to information handling systems and more particularly to operating a display associated with an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, one or more methods, and/or one or more processes may acquire, via a camera associated with an information handling system, a first digital image; may determine, from the first digital image, if a first person is within a field of view of a display associated with the information handling system; if the first person is not within the field of view, may reduce brightness levels of all light emitting diode (LED) pixels of the display; and if the first person is within the field of view: may determine a first brightness level of first multiple LED pixels associated with a central zone associated with the display; may set a brightness level of the first multiple LED pixels associated with the central zone to the first brightness level; may determine, based at least on the first brightness level, multiple second brightness levels for respective multiple zones associated with the display outside the central zone; and for each zone of the multiple zones, may set a brightness level of LED pixels associated with the zone to a respective one of the multiple second brightness levels for the zone.

In one or more embodiments, the one or more systems, the one or more methods, and/or the one or more processes may further, if the first person is within the field of view of the display: acquire, via the camera, a second digital image; determine, from the second digital image, that at least a second person is outside the field of view of the display; determine, based at least on the multiple second brightness levels, multiple third brightness levels for the respective multiple zones associated with the display outside the central zone, in which, for each zone of the multiple zones, the respective brightness level of the multiple third brightness levels is less than the respective brightness level of the multiple second brightness levels; and for each zone of the multiple zones, set the brightness level of the LED pixels associated with the zone to a respective one of the multiple third brightness levels for the zone.

In one or more embodiments, all LED pixels of the display may be organic LED (OLED) pixels. In one or more embodiments, the information handling system may include the display. In one or more embodiments, the second multiple brightness levels may decrease as distances from the central zone to the respective multiple zones increase. In one or more embodiments, each zone of the multiple zones may begin at a top of the display and may end at a bottom of the display. In one or more embodiments, at least two zones of the multiple zones are not directly adjacent to any edge of the display.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, a display of an information handling system may provide privacy of content being displayed. For example, a viewing angle may be reduced, which may mitigate or prevent others from viewing content displayed via the display. In one or more embodiments, privacy may be implemented utilizing a zone-based light emitting diode (LED) panel. For example, the zone-based LED panel may be an organic LED (OLED) panel. For instance, voltages may be set to values respectively associated with zone-pixel transparencies for desirable outputs. In one or more embodiments, zone transparency may be fixed based at least on a screen size and/or transparency requirements. For example, zone transparency may be variable based at least on other inputs such as: camera and/or environment illumination, among others.

In one or more embodiments, one or more digital images may be acquired via a digital camera. A physical location of an observer (e.g., a person) may be determined with respect to a display associated with an information handling system. For example, pixel transmissivity (e.g., pixel brightness) may be determined, based at least on the physical location of the observer, such that legibility for the observer is reduced when away from a field of view associated with the display. In one or more embodiments, the camera and/or a near field sensor may inform the information handling system for user activity and may operate accordingly. In one or more embodiments, a dynamic legibility calculation may be utilized with one or more privacy solutions to help control privacy legibility outside a field of view.

Figure 1A:
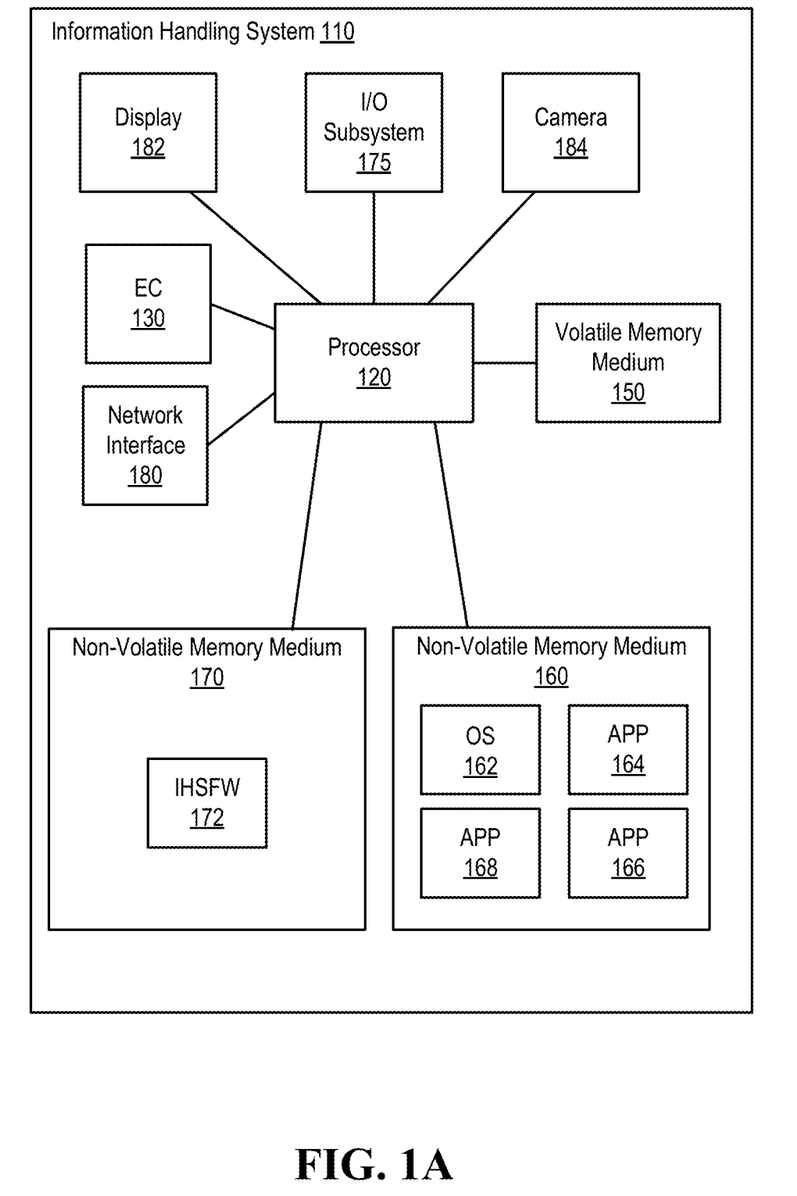
FIG. 1A illustrates an example of an information handling system, according to one or more embodiments.

Turning now to FIG. 1A, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit (I²C) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, an embedded controller (EC) 130, a volatile memory medium 150, non-volatile memory media 160 and 170, an I/O subsystem 175, a network interface 180, a display 182, and a camera 184. As illustrated, EC 130, volatile memory medium 150, non-volatile memory media 160 and 170, I/O subsystem 175, network interface 180, display 182, and camera 184 may be communicatively coupled to processor 120. In one or more embodiments, IHS 110 may not include display 182. For example, display 182 may be external to IHS 110 and may be communicatively coupled to processor 120, not specifically illustrated. In one or more embodiments, IHS 110 may not include camera 184. For example, camera 184 may be external to IHS 110 and may be communicatively coupled to processor 120, not specifically illustrated.

In one or more embodiments, one or more of EC 130, volatile memory medium 150, non-volatile memory media 160 and 170, I/O subsystem 175, network interface 180, display 182, and camera 184 may be communicatively coupled to processor 120 via one or more buses, one or more switches, and/or one or more root complexes, among others. In one example, one or more of EC 130, volatile memory medium 150, non-volatile memory media 160 and 170, I/O subsystem 175, network interface 180, display 182, and camera 184 may be communicatively coupled to processor 120 via one or more PCI-Express (PCIe) root complexes. In another example, one or more of I/O EC 130, subsystem 175, network interface 180, display 182, and camera 184 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing at least a portion of one or more systems, at least a portion of one or more flowcharts, at least a portion of one or more methods, and/or at least a portion of one or more processes described herein. In one example, processor 120 may execute processor instructions from one or more of memory media 150, 160, and 170 in implementing at least a portion of one or more systems, at least a portion of one or more flowcharts, at least a portion of one or more methods, and/or at least a portion of one or more processes described herein. In another example, processor 120 may execute processor instructions via network interface 180 in implementing at least a portion of one or more systems, at least a portion of one or more flowcharts, at least a portion of one or more methods, and/or at least a portion of one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

In one or more embodiments, EC 130 may be or include a remote access controller. For example, the remote access controller may be or include a DELL™ Remote Access Controller (DRAC). In one or more embodiments, a remote access controller may be integrated into IHS 110. For example, the remote access controller may be or include an integrated DELL™ Remote Access Controller (iDRAC). In one or more embodiments, a remote access controller may include one or more of a processor, a memory, and a network interface, among others. In one or more embodiments, a remote access controller may access one or more busses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. In one example, the remote access controller may be based at least on an Intelligent Platform Management Interface (IPMI) standard. For instance, the remote access controller may allow and/or permit utilization of IPMI out-of-band interfaces such as IPMI Over LAN (local area network). In another example, the remote access controller may be based at least on a Redfish standard. In one instance, one or more portions of the remote access controller may be compliant with one or more portions of a Redfish standard. In another instance, one or more portions of the remote access controller may implement one or more portions of a Redfish standard. In one or more embodiments, a remote access controller may include and/or provide one or more internal private networks. For example, the remote access controller may include and/or provide one or more of an Ethernet interface, a front panel USB interface, and a Wi-Fi interface, among others. In one or more embodiments, a remote access controller may be, include, or form at least a portion of a virtual KVM (keyboard, video, and mouse) device. For example, a remote access controller may be, include, or form at least a portion of a KVM over IP (IPKVM) device. For instance, a remote access controller may capture video, keyboard, and/or mouse signals; may convert the signals into packets; and may provide the packets to a remote console application via a network.

In one or more embodiments, EC 130 may be or include a microcontroller. For example, the microcontroller may be or include an 8051 microcontroller, an ARM Cortex-M (e.g., Cortex-M0, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, EC 130 may be or include an application processor. In one example, EC 130 may be or include an ARM Cortex-A processor. In another example, EC 130 may be or include an Intel Atom processor. In one or more embodiments, EC 130 may be or include one or more of a field programmable gate array (FPGA) and an ASIC, among others, configured, coded, and/or encoded with instructions in accordance with at least a portion of one or more of systems, at least a portion of one or more flowcharts, at least a portion of one or more methods, and/or at least a portion of one or more processes described herein.

Figure 1B:
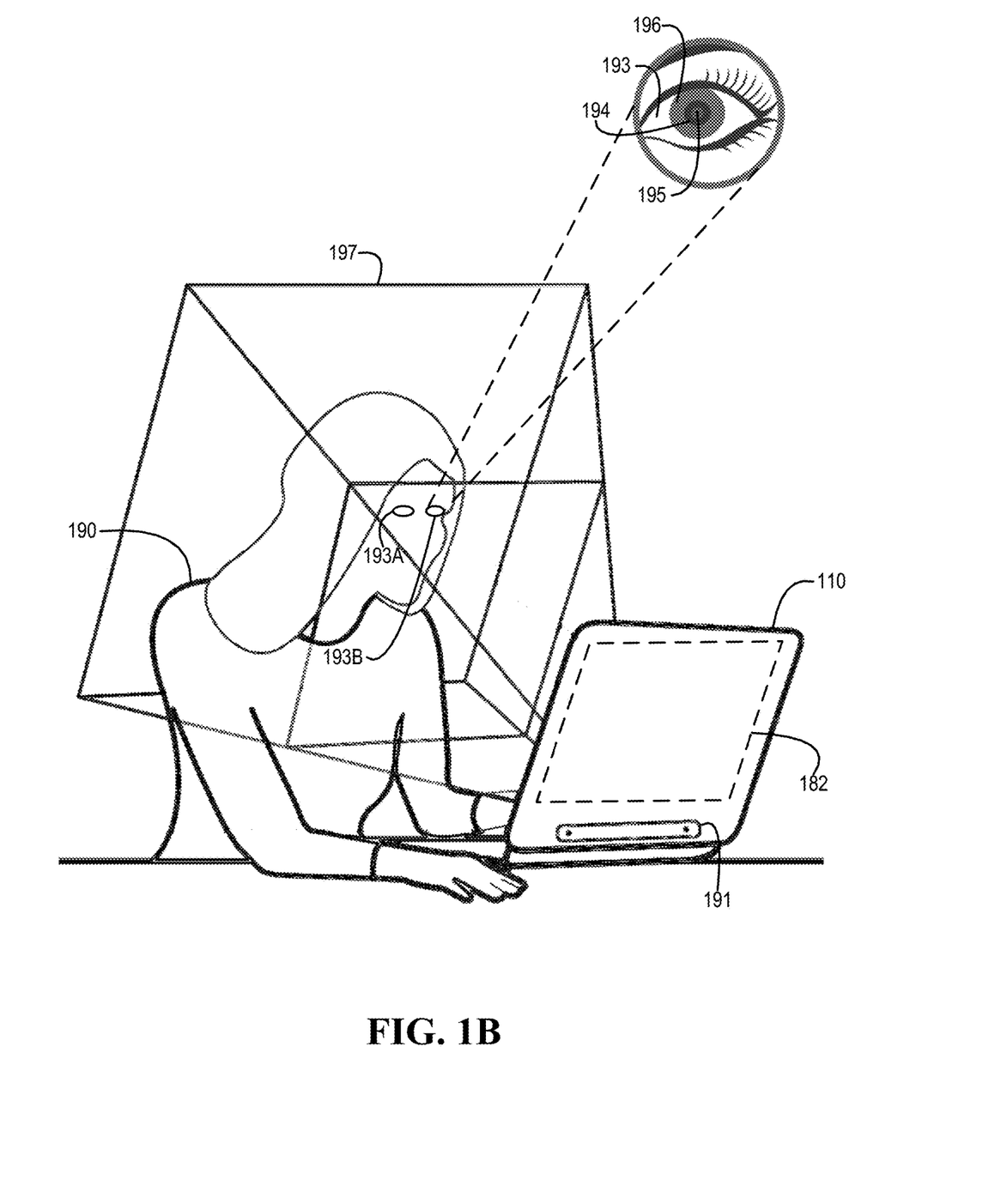
FIG. 1B illustrates an example of a user utilizing an information handling system, according to one or more embodiments.

Turning now to FIG. 1B, an example of a user utilizing an information handling system is illustrated, according to one or more embodiments. As shown, a user 190 (e.g., a person) may utilize IHS 110. As illustrated, IHS 110 may include an eye tracking device 191. Although not specifically illustrated, eye tracking device 191 may be communicatively coupled to one or more of processor 120 and EC 130, among others, according to one or more embodiments. In one or more embodiments, one or more of camera 184 and eye tracking device 191, among others, may track eyes 193A and 193B of user 190. In one example, one or more of camera 184 and eye tracking device 191, among others, may track a pupil 194 of an eye 193. In a second example, one or more of camera 184 and eye tracking device 191, among others, may track a center 195 of a pupil 194 of an eye 193. In another example, one or more of camera 184 and eye tracking device 191, among others, may track an iris 196 of an eye 193.

In one or more embodiments, one or more of eyes 193A and 193B may be illuminated. For example, IHS 110 may provide light emissions to the one or more of eyes 193A and 193B to illuminate the one or more of eyes 193A and 193B. For instance, the light emissions provided to the one or more of eyes 193A and 193B may be outside a visible spectrum of the one or more of eyes 193A and 193B. As an example, the light emissions provided to the one or more of eyes 193A and 193B may be infrared light emissions. For instance, one or more light emitting diodes (LEDs) may provide the infrared light emissions. In one or more embodiments, IHS 110 may include the one or more LEDs that may provide the infrared light emissions.

In one or more embodiments, one or more of camera 184 and eye tracking device 191, among others, may be utilized in determining a location eyes 193A and 193B are with respect to a field of view 197. For example, a location of user 190 with respect to field of view 197 may be determined based at least on the location eyes 193A and 193B with respect to field of view 197. In one or more embodiments, brightness of one or more portions of display 182 may be determined based at least on the location of user 190 with respect to field of view 197

Figure 2:
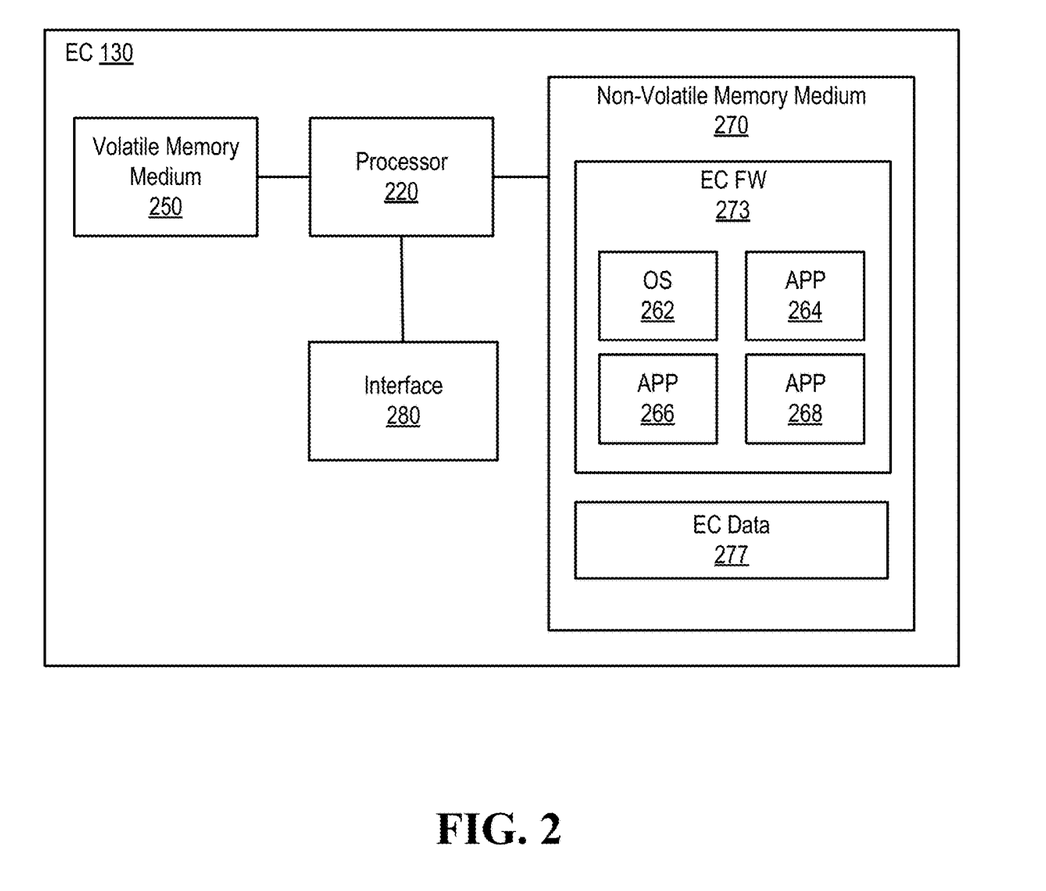
FIG. 2 illustrates an example of an embedded controller, according to one or more embodiments.

Turning now to FIG. 2, an example of an embedded controller is illustrated, according to one or more embodiments. As shown, EC 130 may include a processor 220, a volatile memory medium 250, a non-volatile memory medium 270, and an interface 280. As illustrated, non-volatile memory medium 270 may include a EC firmware (FW) 273, which may include an OS 262 and APPs 264-268, and may include EC data 277. In one example, OS 262 may be or include a real-time operating system (RTOS). For instance, the RTOS may be or include FreeRTOS, OpenRTOS, SafeRTOS, QNX, ThreadX, VxWorks, NuttX, TI-RTOS, eCos, MicroC/OS, or Zephyr, among others. In a second example, OS 262 may be or include an Unix-like operating system. For instance, the Unix-like operating system may be or include LINUX®, FREEBSD®, NETBSD®, OpenBSD, Minix, Xinu, or Darwin, among others. In another example, OS 262 may be or include a portable operating system interface (POSIX) compliant operating system.

In one or more embodiments, interface 280 may include circuitry that enables communicatively coupling to one or more devices. In one example, interface 280 may include circuitry that enables communicatively coupling to one or more buses. For instance, the one or more buses may include one or more buses described herein, among others. In a second example, interface 280 may include circuitry that enables one or more interrupt signals to be received. In one instance, interface 280 may include general purpose input/output (GPIO) circuitry, and the GPIO circuitry may enable one or more interrupt signals to be received and/or provided via at least one interrupt line. In another instance, interface 280 may include GPIO circuitry that may enable EC 130 to provide and/or receive signals associated with other circuitry (e.g., diagnostic circuitry, etc.). In a third example, interface 280 may include circuitry that enables communicatively coupling to one or more networks. In one instance, interface 280 may include circuitry that enables communicatively coupling to network interface 180. In another example, interface 280 may include a network interface.

In one or more embodiments, one or more of OS 262 and APPs 264-268 may include processor instructions executable by processor 220. In one example, processor 220 may execute processor instructions of one or more of OS 262 and APPs 264-268 via non-volatile memory medium 270. In another example, one or more portions of the processor instructions of the one or more of OS 262 and APPs 264-268 may be transferred to volatile memory medium 250, and processor 220 may execute the one or more portions of the processor instructions of the one or more of OS 262 and APPs 264-268 via volatile memory medium 250. In one or more embodiments, processor 220 may execute instructions in accordance with at least a portion of one or more systems, at least a portion of one or more flowcharts, one or more methods, and/or at least a portion of one or more processes described herein. For example, non-volatile memory medium 270 and/or volatile memory medium 250 may store instructions that may be executable in accordance with at least a portion of one or more systems, at least a portion of one or more flowcharts, at least a portion of one or more methods, and/or at least a portion of one or more processes described herein. In one or more embodiments, processor 220 may execute instructions in accordance with at least a portion of one or more of systems, flowcharts, at least a portion of one or more methods, and/or at least a portion of one or more processes described herein. For example, non-volatile memory medium 270 and/or volatile memory medium 250 may store instructions that may be executable in accordance with at least a portion of one or more of systems, at least a portion of one or more flowcharts, at least a portion of one or more methods, and/or at least a portion of one or more processes described herein. In one or more embodiments, processor 220 may utilize EC data 277. In one example, processor 220 may utilize EC data 277 via non-volatile memory medium 270. In another example, one or more portions of EC data 277 may be transferred to volatile memory medium 250, and processor 220 may utilize EC data 277 via volatile memory medium 250.

Figure 3A:
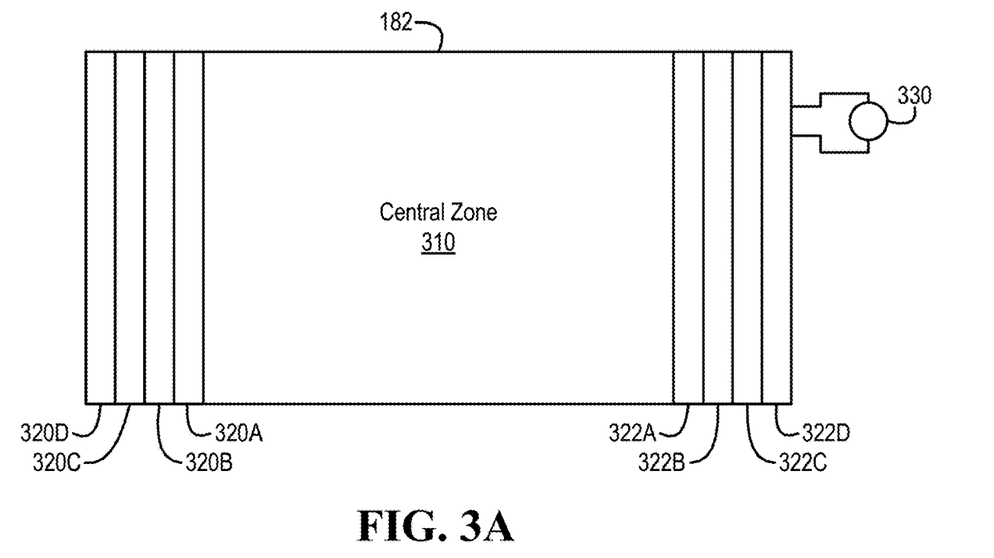
FIG. 3A illustrates an example of zones associated with a display, according to one or more embodiments.

Turning now to FIG. 3A, an example of zones associated with a display is illustrated, according to one or more embodiments. As shown, a central zone 310 may be associated with display 182. As illustrated, zones 320A-320D may be associated with display 182. As shown, zones 322A-322D may be associated with display 182. As illustrated, a voltage source 330 may be associated with display 182. For example, voltage source 330 may be utilized to control brightness levels of one or more LED pixels of display 182. In one instance, processor 120 may utilize voltage source 330 to control brightness levels of one or more LED pixels of display 182. In another instance, EC 130 may utilize voltage source 330 to control brightness levels of one or more LED pixels of display 182. In one or more embodiments, display 182 may include voltage source 330. In one or more embodiments, voltage source 330 may be external to display 182.

In one or more embodiments, brightness levels of LED pixels associated with a zone may be decreased based at least on a distance of the zone from central zone 310. In one example, brightness levels of LED pixels associated with a zone 320 may be decreased based at least on a distance of zone 320 from central zone 310. For instance, a brightness level of 320A may be less than a brightness level of central zone 310, a brightness level of 320B may be less than the brightness level of zone 320A, a brightness level of 320C may be less than the brightness level of zone 320B, and a brightness level of 320D may be less than the brightness level of zone 320C. In another example, brightness levels of LED pixels associated with a zone 322 may be decreased based at least on a distance of zone 322 from central zone 310. For instance, a brightness level of zone 322A may be less than a brightness level of central zone 310, a brightness level of zone 322B may be less than the brightness level of zone 322A, a brightness level of zone 322C may be less than the brightness level of zone 322B, and a brightness level of zone 322D may be less than the brightness level of zone 322C. In one or more embodiments, two or more zones may have a same brightness level. In one example, two or more of zones 320A-320D may have a same brightness level. In a second example, two or more of zones 322A-322D may have a same brightness level. In another example, two or more of zones 320A-320D and 322A-322D may have a same brightness level. For instance, brightness levels of zones 320A-320D may be brightness levels of zones 322A-322D, respectively.

Figure 3B:
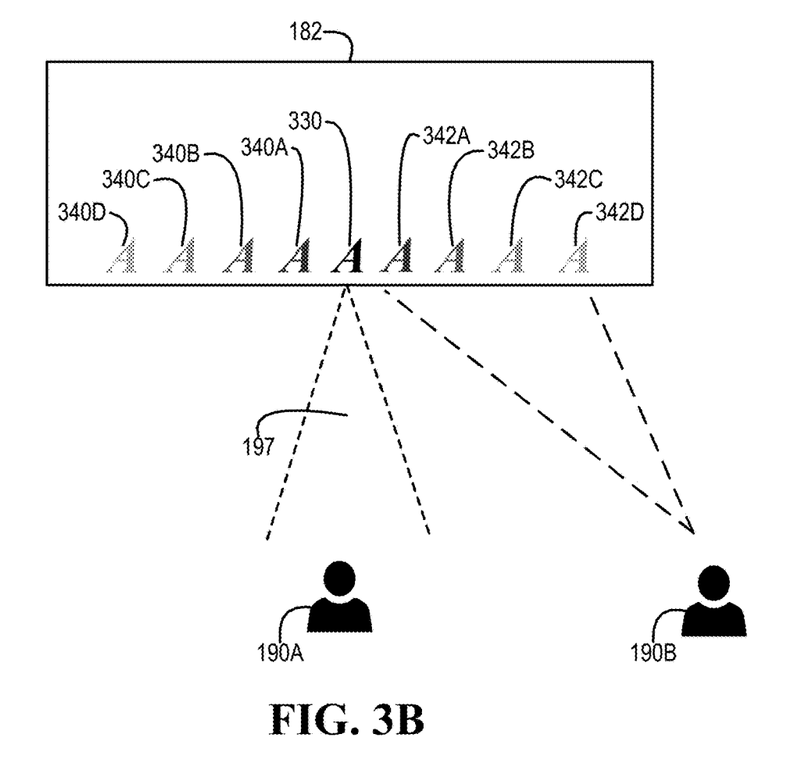
FIG. 3B illustrates an example of viewing text displayed via a display, according to one or more embodiments.

Turning now to FIG. 3B, an example of viewing text displayed via a display is illustrated, according to one or more embodiments. As shown, a person 190A may be within field of view 197. As illustrated, a person 190B may not be within field of view 197. For example, person 190B may be outside field of view 197. As shown, text 330 may be displayed at a brightness level of central zone 310. For example, text 330 may be displayed via central zone 310. As illustrated, text 340A-340D may be displayed at decreasing brightness levels. For example, text 340A-340D may be respectively displayed via zones 320A-320D. As shown, text 342A-342D may be displayed at decreasing brightness levels. For example, text 342A-342D may be respectively displayed via zones 322A-322D. In one or more embodiments, person 190A may be able to read and/or perceive text 340A-340D and/or text 342A-342D. In one or more embodiments, person 190B may not be able to read and/or perceive one or more of text 340A-340D and text 342A-342D.

Figure 4:
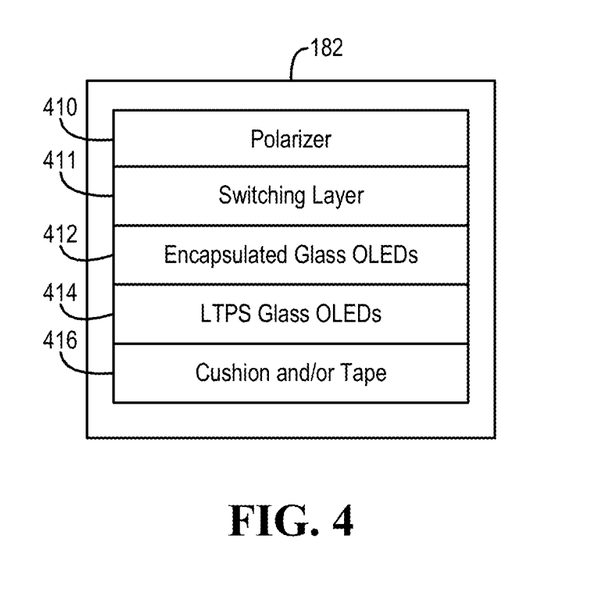
FIG. 4 illustrates an example of a display, according to one or more embodiments.

Turning now to FIG. 4, an example of a display is illustrated, according to one or more embodiments. As shown, display 182 may include layers 410-416. As illustrated, layer 410 may include a polarizer. As illustrated, layer 411 may be a switching layer. In one or more embodiments, the switching layer may include liquid crystals. For example, the liquid crystals may be controlled to dim one or more portions of display 182. For instance, privacy may be implemented via dimming one or more portions of display 182 via controlling the liquid crystals of layer 411. As shown, layer 412 may include encapsulated glass organic LEDs (OLEDs). As illustrated, layer 414 may include low temperature polysilicon (LTPS) glass OLEDs. As shown, layer 416 may include a cushion and/or tape.

Figure 5:
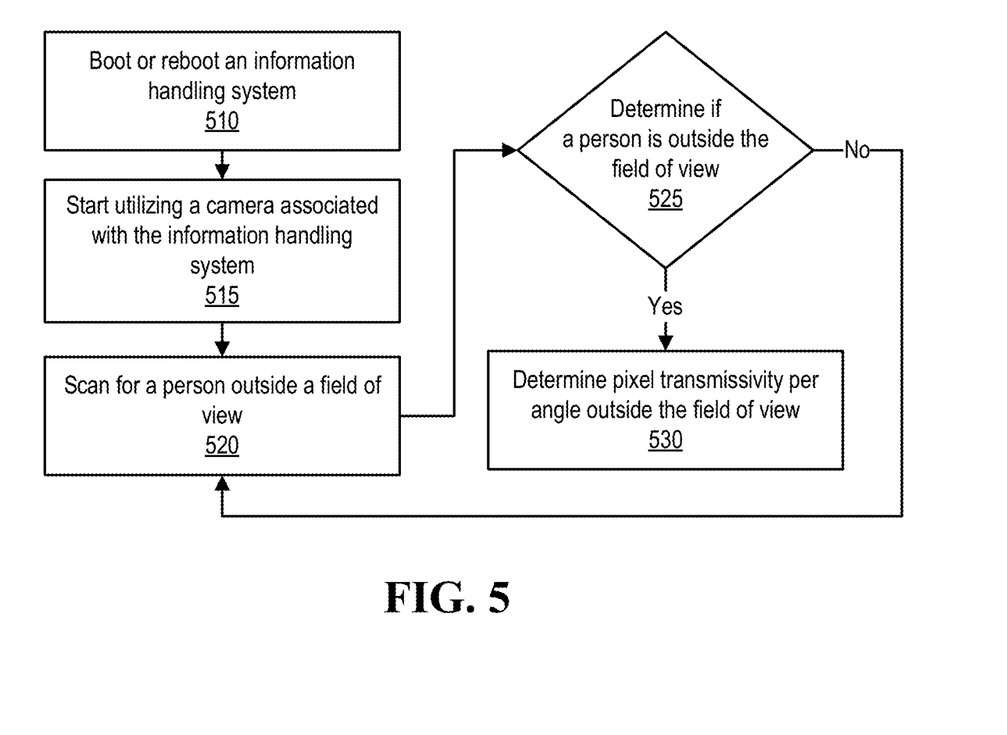
FIG. 5 illustrates an example of a method of operating a display, according to one or more embodiments.

Turning now to FIG. 5, an example of a method of operating a display is illustrated, according to one or more embodiments. At 510, an information handling system may be booted or rebooted. For example, IHS 110 may be booted or rebooted. At 515, utilizing a camera, associated with the information handling system, may start. For example, IHS 110 may start utilizing camera 184. For instance, IHS 110 may acquire one or more digital images via camera 184. At 520, a person outside a field of view may be scanned for. For example, IHS 110 may scan for a person outside field of view 197. For instance, scanning for a person outside field of view 197 may include analyzing one or more digital images acquired via camera 184. At 525, it may be determined if a person is outside the field of view. If a person is not outside the field of view, the method may proceed to 520, according to one or more embodiments. If a person is outside the field of view, pixel transmissivity per angle outside the field of view may be determined, at 530. In one or more embodiments, brightness levels of zones 320A-320D and 322A-322D may be configured based at least on the angle outside the field of view. For example, brightness levels of LED pixels associated with zones 320A-320D and 322A-322D may be configured based at least on the angle outside the field of view.

Figure 6A:
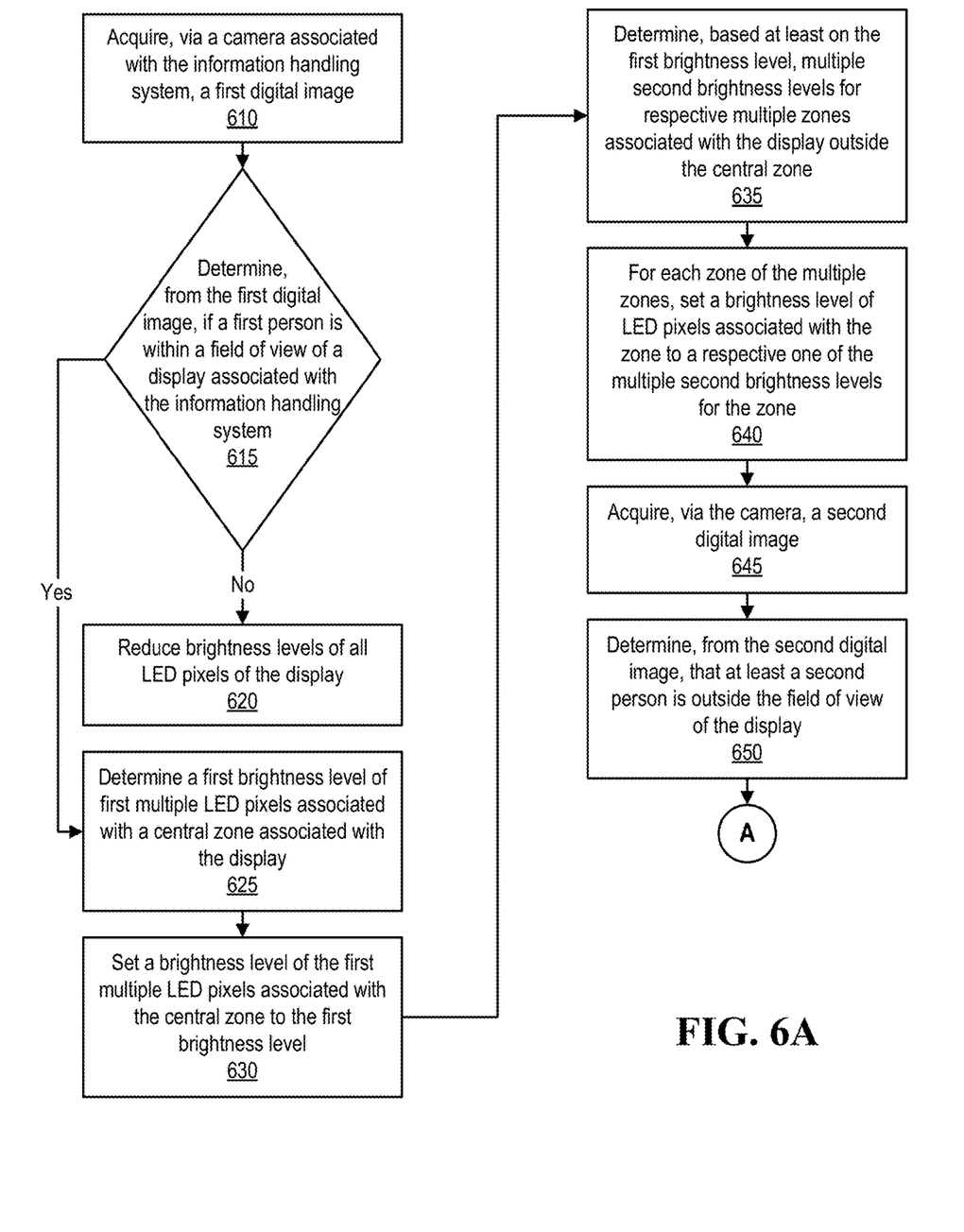
FIGS. 6A and 6B illustrate another example of operation a display, according to one or more embodiments.
Figure 6B:
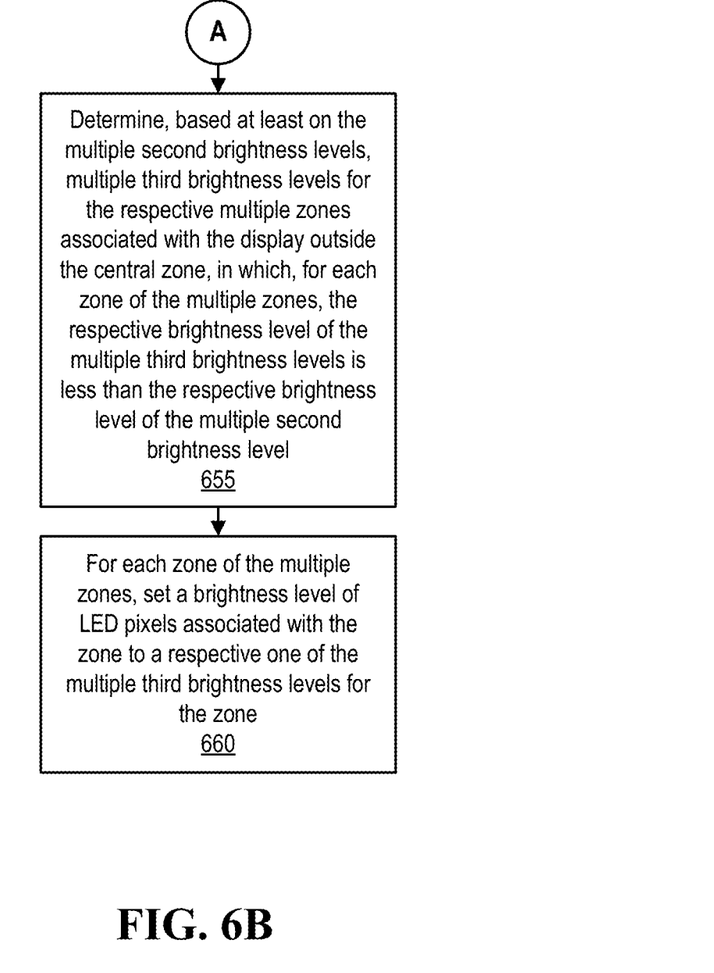

Turning now to FIGS. 6A and 6B, another example of operating a display is illustrated, according to one or more embodiments. At 610, a first digital image, via a camera associated with an information handling system, may be acquired. For example, IHS 110 may acquire a first digital image via camera 184. In one or more embodiments, acquiring a digital image from a camera may include receiving the digital image from the camera.

At 615, it may be determined, from the first digital image, if a first person is within a field of view of a display associated with the information handling system. For example, it may be determined if person 190A is within field of view 197 of display 182. If the first person is not within the field of view of the display, brightness levels of all LED pixels of the display may be reduced, at 620. If the first person is within the field of view of the display, a first brightness level of first multiple LED pixels associated with a central zone associated with the display may be determined, at 625.

At 630, a brightness level of the first multiple LED pixels associated with the central zone may be set to the first brightness level. For example, a brightness level of multiple LED pixels associated with central zone 310 may be set to the first brightness level. At 635, multiple second brightness levels for respective multiple zones associated with the display outside the central zone may be determined based at least on the first brightness level. In one or more embodiments, the multiple zones associated with the display outside the central zone may include two or more of zones 320A-320D and 322A-322D. As an example, multiple second brightness levels for zones 320A-320D may be determined based at least on the first brightness level. In another example, multiple second brightness levels for zones 322A-322D may be determined based at least on the first brightness level.

At 640, for each zone of the multiple zones, a brightness level of LED pixels associated with the zone may be set to a respective one of the multiple second brightness levels for the zone. In one example, for each zone 320 of zones 320A-320D, LED pixels associated with the zone 320 may be set to the brightness level for the zone 320. In one instance, a brightness level of LED pixels associated with zone 320A may be set to a first brightness level of the multiple second brightness levels. In a second instance, a brightness level of LED pixels associated with zone 320B may be set to a second brightness level of the multiple second brightness levels. In a third instance, a brightness level of LED pixels associated with zone 320C may be set to a third brightness level of the multiple second brightness levels. In another instance, a brightness level of LED pixels associated with zone 320D may be set to a fourth brightness level of the multiple second brightness levels.

In another example, for each zone 322 of zones 322A-322D, LED pixels associated with the zone 322 may be set to the brightness level for the zone 322. In one instance, a brightness level of LED pixels associated with zone 322A may be set to a first brightness level of the multiple second brightness levels. In a second instance, a brightness level of LED pixels associated with zone 322B may be set to a second brightness level of the multiple second brightness levels. In a third instance, a brightness level of LED pixels associated with zone 322C may be set to a third brightness level of the multiple second brightness levels. In another instance, a brightness level of LED pixels associated with zone 322D may be set to a fourth brightness level of the multiple second brightness levels.

In one or more embodiments, the multiple zones may include 320A-320D and zones 322A-322D. In one example, a brightness level of LED pixels associated with zone 320A and zone 322A may be set to a first brightness level of the multiple second brightness levels. In a second example, a brightness level of LED pixels associated with zone 320B and zone 322B may be set to a second brightness level of the multiple second brightness levels. In a third example, a brightness level of LED pixels associated with zone 320C and zone 322C may be set to a third brightness level of the multiple second brightness levels. In another example, a brightness level of LED pixels associated with zone 320C and zone 322D may be set to a fourth brightness level of the multiple second brightness levels.

At 645, a second digital image may be acquired via the camera. For example, IHS 110 may acquire a second digital image via camera 184. At 650, it may be determined, from the second digital image, that at least a second person is outside the field of view of the display. For example, IHS 110 may determine, from the second digital image, that at least person 190B is outside field of view 197 of display 182.

At 655, multiple third brightness levels for the respective multiple zones, based at least on the second multiple brightness levels may be determined, in which, for each zone of the multiple zones, the respective brightness level of the multiple third brightness levels is less than the respective brightness level of the multiple second brightness levels. In one or more embodiments, determining the multiple third brightness levels for the respective multiple zones may be performed in response to determining that the at least the second person is outside the field of view of the display. At 660, for each zone of the multiple zones, a brightness level of LED pixels associated with the zone may be set to a respective one of the multiple second brightness levels for the zone.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   at least one processor; and
   a memory medium, coupled to the at least one processor, that stores instructions executable by the at least one processor, which when executed by the at least one processor, cause the information handling system to:
   acquire, via a camera associated with the information handling system, a first digital image;
   determine, from the first digital image, if a first person is within a field of view of a display associated with an information handling system;
   if the first person is not within the field of view of the display, reduce brightness levels of all light emitting diode (LED) pixels of the display; and
   if the first person is within the field of view of the display:
   determine a first brightness level of a first plurality of LED pixels associated with a central zone associated with the display;
   set a brightness level of the first plurality of LED pixels associated with the central zone to the first brightness level;
   determine, based at least on the first brightness level, a plurality of second brightness levels for a respective plurality of zones associated with the display outside the central zone, wherein at least two zones of the plurality of zones are not directly adjacent to any edge of the display; and
   for each zone of the plurality of zones, set a brightness level of LED pixels associated with the zone to a respective one of the plurality of second brightness levels for the zone, wherein the plurality of second brightness levels decrease as distances from the central zone to the respective plurality of zones increase.

2. The information handling system of claim 1, wherein the instructions further cause the information handling system to:
   if the first person is within the field of view of the display:
   acquire, via the camera, a second digital image;
   determine, from the second digital image, that at least a second person is outside the field of view of the display;
   in response to determining that at least the second person is outside the field of view of the display, determine, based at least on the plurality of second brightness levels, a plurality of third brightness levels for the respective plurality of zones associated with the display outside the central zone, wherein, for each zone of the plurality of zones, the respective brightness level of the plurality of third brightness levels is less than the respective brightness level of the plurality of second brightness levels; and
   for each zone of the plurality of zones, set the brightness level of the LED pixels associated with the zone to a respective one of the plurality of third brightness levels for the zone.

3. The information handling system of claim 1, wherein all LED pixels of the display are organic LED (OLED) pixels.

4. The information handling system of claim 1, further comprising:
   the display.

5. The information handling system of claim 1, wherein each zone of the plurality of zones begins at a top of the display and ends at a bottom of the display.

6. The information handling system of claim 1, further comprising:
   if the first person is within the field of view of the display:
   acquiring, by the camera, a second digital image;
   determining, from the second digital image, that at least a second person is outside the field of view of the display;
   in response to the determining that at least the second person is outside the field of view of the display, determining, based at least on the plurality of second brightness levels, a plurality of third brightness levels for the respective plurality of zones associated with the display outside the central zone, wherein, for each zone of the plurality of zones, the respective brightness level of the plurality of third brightness levels is less than the respective brightness level of the plurality of second brightness levels; and
   for each zone of the plurality of zones, setting the brightness level of the LED pixels associated with the zone to a respective one of the plurality of third brightness levels for the zone.

7. The information handling system of claim 1, wherein all LED pixels of the display are organic LED (OLED) pixels.

8. The information handling system of claim 1, wherein the information handling system includes the display.

9. The information handling system of claim 1, wherein each zone of the plurality of zones begins at a top of the display and ends at a bottom of the display.

10. A method, comprising:
    acquiring, by a camera associated with an information handling system, a first digital image;
    determining, from the first digital image, if a first person is within a field of view of a display associated with an information handling system;
    if the first person is not within the field of view of the display, reducing brightness levels of all light emitting diode (LED) pixels of the display; and
    if the first person is within the field of view of the display:
    determining a first brightness level of a first plurality of LED pixels associated with a central zone associated with the display;
    determining, based at least on the first brightness level, a plurality of second brightness levels for a respective plurality of zones associated with the display outside the central zone, wherein at least two zones of the plurality of zones are not directly adjacent to any edge of the display;
    setting a brightness level of the first plurality of LED pixels associated with the central zone to the first brightness level; and
    for each zone of the plurality of zones, setting a brightness level of LED pixels associated with the zone to a respective one of the plurality of second brightness levels for the zone, wherein the plurality of second brightness levels decrease as distances from the central zone to the respective plurality of zones increase.

11. A computer-readable non-transitory memory medium that includes instructions that, when executed by at least one processor of an information handling system, cause the information handling system to:
   acquire, via a camera associated with the information handling system, a first digital image;
   determine, from the first digital image, if a first person is within a field of view of a display associated with an information handling system;
   if the first person is not within the field of view of the display, reduce brightness levels of all light emitting diode (LED) pixels of the display; and
   if the first person is within the field of view of the display:
      determine a first brightness level of a first plurality of LED pixels associated with a central zone associated with the display;
      determine, based at least on the first brightness level, a plurality of second brightness levels for a respective plurality of zones associated with the display outside the central zone, wherein at least two zones of the plurality of zones are not directly adjacent to any edge of the display;
      set a brightness level of the first plurality of LED pixels associated with the central zone to the first brightness level; and
      for each zone of the plurality of zones, set a brightness level of LED pixels associated with the zone to a respective one of the plurality of second brightness levels for the zone, wherein the plurality of second brightness levels decrease as distances from the central zone to the respective plurality of zones increase.

12. The computer-readable non-transitory memory medium of claim 11, wherein the instructions further cause the information handling system to:
   if the first person is within the field of view of the display:
      acquire, via the camera, a second digital image;
      determine, from the second digital image, that at least a second person is outside the field of view of the display;
      in response to determining that at least the second person is outside the field of view of the display, determine, based at least on the plurality of second brightness levels, a plurality of third brightness levels for the respective plurality of zones associated with the display outside the central zone, wherein, for each zone of the plurality of zones, the respective brightness level of the plurality of third brightness levels is less than the respective brightness level of the plurality of second brightness levels; and
      for each zone of the plurality of zones, set the brightness level of the LED pixels associated with the zone to a respective one of the plurality of third brightness levels for the zone.

13. The computer-readable non-transitory memory medium of claim 11, wherein all LED pixels of the display are organic LED (OLED) pixels.

14. The computer-readable non-transitory memory medium of claim 11, wherein each zone of the plurality of zones begins at a top of the display and ends at a bottom of the display.

* * * * *